US007455905B2

(12) United States Patent
Ye et al.

(10) Patent No.: US 7,455,905 B2
(45) Date of Patent: Nov. 25, 2008

(54) IRON BASED SOFT MAGNETIC POWDER HAVING AN INSULATING COATING

(75) Inventors: Zhou Ye, Höganäs (SE); Ola Andersson, Nyhamnsläge (SE)

(73) Assignee: Höganäs AB, Höganäs (SE)

( * ) Notice: Subject to any disclaimer, the term of this patent is extended or adjusted under 35 U.S.C. 154(b) by 332 days.

(21) Appl. No.: 10/568,952

(22) PCT Filed: Sep. 8, 2004

(86) PCT No.: PCT/SE2004/001296

§ 371 (c)(1), (2), (4) Date: Feb. 22, 2006

(87) PCT Pub. No.: WO2005/023464

PCT Pub. Date: Mar. 17, 2005

(65) Prior Publication Data

US 2006/0214138 A1 Sep. 28, 2006

(30) Foreign Application Priority Data

Sep. 9, 2003 (SE) .................................... 0302427

(51) Int. Cl.

| | |
|---|---|
| ***B32B 5/16*** | (2006.01) |
| ***B05D 3/10*** | (2006.01) |
| ***B05D 3/12*** | (2006.01) |
| ***B05D 5/12*** | (2006.01) |

(52) U.S. Cl. ....................... 428/403; 427/127; 427/216; 427/369; 427/370; 428/472.3; 428/546; 428/552; 428/570

(58) Field of Classification Search ................. 428/403, 428/472.3, 546, 552, 570; 427/216, 127, 427/343, 369, 370
See application file for complete search history.

(56) References Cited

U.S. PATENT DOCUMENTS

| | | | | |
|---|---|---|---|---|
| 4,776,980 | A * | 10/1988 | Ruffini | 252/513 |
| 5,063,011 | A * | 11/1991 | Rutz et al. | 264/126 |
| 5,595,609 | A | 1/1997 | Gay | |
| 6,054,219 | A * | 4/2000 | Satsu et al. | 428/403 |
| 6,309,748 | B1 * | 10/2001 | Lashmore et al. | 428/403 |
| 6,344,273 | B1 * | 2/2002 | Satsu et al. | 428/403 |
| 6,348,265 | B1 * | 2/2002 | Jansson et al. | 428/403 |
| 6,372,348 | B1 * | 4/2002 | Hanejko et al. | 428/407 |
| 6,503,444 | B1 * | 1/2003 | Andersson | 419/48 |
| 7,153,594 | B2 * | 12/2006 | Kejzelman et al. | 428/838 |

FOREIGN PATENT DOCUMENTS

| | | |
|---|---|---|
| WO | 89/04540 | 5/1989 |
| WO | 96/30144 | 10/1996 |

* cited by examiner

*Primary Examiner*—H. T Le
(74) *Attorney, Agent, or Firm*—Buchanan Ingersoll & Rooney PC

(57) ABSTRACT

The present invention concerns a high purity, annealed iron powder suitable for the preparation of soft magnetic composites. The powder is distinguished in that the content of inevitable impurities is less than 0.30% by weight, the oxygen content is less than 0.05% by weight, and the specific surface area as measured by the BET method is less than 60 $m^2/kg$.

22 Claims, 2 Drawing Sheets

IRON BASED SOFT MAGNETIC POWDER HAVING AN INSULATING COATING

FIELD OF THE INVENTION

The present invention relates to new soft magnetic composite powder and a new soft magnetic powder for producing the composite powder. More specifically, the invention concerns a new iron-based powder which is useful for the preparation of soft magnetic materials having improved properties when used both at high and low frequencies. The invention also concerns a method for the manufacturing of soft magnetic composite components of the new powder.

BACKGROUND OF THE INVENTION

Soft magnetic materials are used for applications, such as core materials in inductors, stators and rotors for electrical machines, actuators, sensors and transformer cores. Traditionally, soft magnetic cores, such as rotors and stators in electric machines, are made of stacked steel laminates. Soft Magnetic Composite, SMC, materials are based on soft magnetic particles, usually iron-based, with an electrically insulating coating on each particle. By compacting the insulated particles optionally together with lubricants and/or binders using the traditionally powder metallurgy process, the SMC parts are obtained. By using this powder metallurgical technique it is possible to produce materials having a higher degree of freedom in the design of the SMC component than by using the steel laminates as the SMC material can carry a three dimensional magnetic flux and as three dimensional shapes can be obtained by the compaction process.

Two key characteristics of an iron core component are its magnetic permeability and core loss characteristics. The magnetic permeability of a material is an indication of its ability to become magnetised or its ability to carry a magnetic flux. Permeability is defined as the ratio of the induced magnetic flux to the magnetising force or field intensity. When a magnetic material is exposed to a varying field, energy losses occur due to both hysteresis losses and eddy current losses. The hysteresis loss is brought about by the necessary expenditure of energy to overcome the retained magnetic forces within the iron core component. The eddy current loss is brought about by the production of electric currents in the iron core component due to the changing flux caused by alternating current (AC) conditions.

Research in the powder-metallurgical manufacture of magnetic core components using coated iron-based powders has been directed to the development of iron powder compositions that enhance certain physical and magnetic properties without detrimentally affecting other properties of the final component. Desired component properties include e.g. a high permeability through an extended frequency range, low core losses, high saturation induction, and high strength. Normally an increased density of the component enhances all of these properties. The desired powder properties include suitability for compression moulding techniques, which i.e. means that the powder can be easily moulded to a high density component, which can be easily ejected from the moulding equipment. In order to minimize the eddy current losses in components made of soft magnetic composite powders much effort have been directed to increase the resisitvity of the coating surrounding the soft magnetic metal powder. By altering for example the chemical composition of the coating or the thickness of the coating the resisitvity is affected. However, improvements of the resisitivity normally has a negative effect on the magnetic permeability of a soft magnetic composite component at a given density.

A large number of patent publications teach different types of electrically insulating coatings. Examples of recently published patents concerning inorganic coatings are the U.S. Pat. No. 6,309,748 and U.S. Pat. No. 6,348,265. Coatings of organic materials are known from e.g. the U.S. Pat. No. 5,595, 609. Coatings comprising both inorganic and organic material are known from e.g. the U.S. Pat. Nos. 6,372,348 and 5,063,011, according to which publication the particles are surrounded by an iron phosphate layer and a thermoplastic material.

In contrast to the above patents which disclose improvements in one or more properties of the obtained soft magnetic components due to different types of electrical insulation coatings, the present invention is based on the discovery that unexpected advantages can be obtained depending on the nature of the base powder i.e. the powder, the particles of which are not coated or electrically insulated. Especially unexpected is the finding that a more pure base powder increases the resistivity (decreases the eddy current loss) of the final soft magnetic component. It has thus been found that the permeability and total loss can be remarkably improved by using as a base powder a powder which is very pure, has a low oxygen content and a low specific surface.

SUMMARY OF THE INVENTION

In brief the powder according to the present invention is a high purity, annealed iron powder consisting of base particles surrounded by an electrically insulating coating. Furthermore the base powder is distinguished by a content of inevitable impurities, which is less than 0.30%, an oxygen content which is less than 0.05% and a specific surface area as measured by the BET method which is less than 60 $m^2/kg$.

Highly pure iron powders suitable for the preparation of SMC materials are described in the U.S. Pat. No. 4,776,980. According to this patent use is made of an electrolytically prepared powder. Particularly it is stated that the particle shape is important and that the particles should be non-spherical and be disc-shaped. A main difference between the powders according to the present invention and the invention disclosed in the US patent is that the powder according to the present invention is prepared by the much less expensive water atomisation which gives particles having an irregular shape. Additionally particles prepared by water atomisation are much larger than electrolytically particles and the average particles size of the particles used according to the present invention may vary between 100 and 450 especially 180 and 360 μm. No specific magnetic data are provided for the exemplified powder.

SPECIFIC SURFACE AREA OF THE PARTICLES

Figure 1:
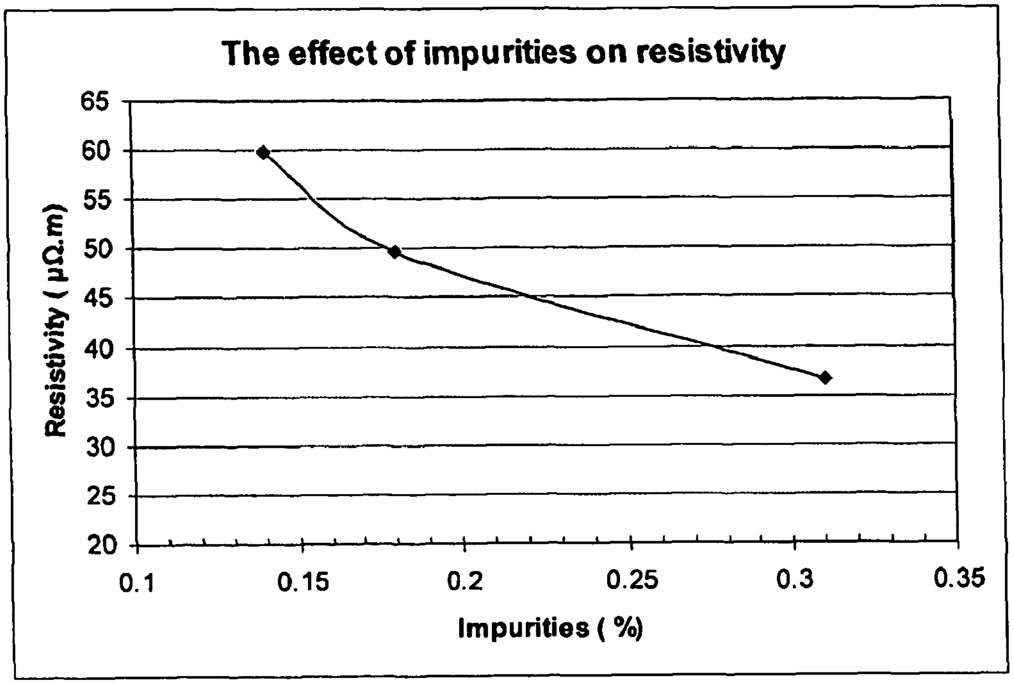
FIG. 1 shows the effect of the content of impurities other than oxygen in the parent phase of the phosphate coated iron powder versus the resistivity of a moulded and heat-treated body produced from the powder.

According to the present invention it has been found that the specific surface area of the particles is a distinguishing feature. The specific surface area of the particles depends on the particle size distribution, the particle shape and the roughness of the particles. The occurrence of so called open porosity of the particles will also have an impact on the specific surface area. The specific surface area is normally measured by the so-called BET method and the result is expressed in $m^2/kg$.

The surface area of granulated and powdered solids or porous material is measured by determining the quantity of gas that absorbs as a single layer of molecules a so called monomolecular layer on a sample. This adsorption is done at or near the boiling point of the adsorbate gas. Under specific conditions the area covered by each gas molecule is known within relatively narrow limits. The area of the sample is thus calculable directly from the number of adsorbed molecules, which is derived from the gas quantity at the prescribed conditions and occupied by each. For a nitrogen and helium mixture of 30 volume % nitrogen the conditions most favourable for the formation of a monolayer of adsorbed nitrogen are establish at atmospheric pressure and the temperature of liquid nitrogen. The method should give an error less then 5% of measured result.

In the context of the present invention it has been found that the specific surface area should be less than about 60 $m^2/kg$. Preferably the specific surface area of the powder is less than 58, more preferably less than 55 $m^2/kg$. A specific surface area less than 10 $m^2/kg$ is less suitable as the moulded component will then get a too low strength. Furthermore it is preferred that the particles have an irregular form and are prepared by water atomising.

Impurities

The degree of purity is another important feature of the base powder and it has been found that the powder should be very pure and include iron with a total amount of impurities not exceeding 0.30% of the base powder. Preferred are powders having less than 0.25, preferably less than 0.20% by weight of impurities. A base powder having a low amount of impurities may be obtained by using pure steel scrap. Impurities that may be present in the base powder are e.g. Cr, Cu, Mn, Ni, P, S, Si, C. Oxygen is not regarded as an impurity in the context of the present invention.

Oxygen Content

A sufficiently low oxygen content, less than 0.05% by weight of the powder, may be obtained by annealing the base powder at a temperature and time sufficient for obtaining the low oxygen content. Preferably the powders according to the invention have an oxygen content less than 0.04% by weight. The annealing temperature may vary between 900° C. and 1300° C. and the annealing periods may vary depending on the size of the oven, the type of heating, amount of material loaded in the oven etc. Normally used annealing times may vary between 5 and 300, preferably between 10 and 100 minutes.

Coating

According to the invention the annealed base powder is provided with an electrically insulating coating or barrier. Suitably this coating is a uniform and very thin and of the type described in the US patent U.S. Pat. No. 6,348,265 which is hereby incorporated by reference. Such an insulating coating may be applied on the base powder particles by treating the base powder with phosphoric acid in an organic solvent for a period sufficient to obtain the indicated amounts. The concentration of the phosphoric acid in the organic solvent may vary between 0.5 and 50%, preferably between 0.5 and 30%. As such a coating will add oxygen and phosphorous to the iron base powder particles, a chemical analysis of the coated powder will have oxygen and phosphorous contents which are higher than those of the uncoated powder. Thus the oxygen content should preferably be at most 0.20% and phosphorous content at most 0.10% of the coated powder. However also other types of insulating coatings may be used.

A thin even coating on an iron powder will have negligible influence on the specific surface area of the coated powder compared with the specific surface area of the base powder. According to the present invention a coating will only to a minor extent influence the specific surface area which means that the specific surface area of the coated iron powder will be more or less the same as the specific surface area of the uncoated iron powder.

Lubricant and Other Additives

The iron-based powder thus provided with an electrical insulation can be combined with a lubricant in an amount up to 4% by weight. Normally the amount of lubricant varies between 0.1 and 2% by weight, preferably 0.1-1.0% by weight of the powder composition. Representative examples of lubricants used at ambient temperatures (low temperature lubricants) are: Kenolube®, Ethylene-bis-stearamide (EBS) and metal stearates, such as zinc stearate. Representative examples of lubricants used at elevated temperatures (high temperature lubricants) are Promold® or lithium stearate.

Optionally the composition to be compacted may also include a binder in order to enhance the strength of the SMC component. Examples of binders are thermosetting or thermoplastic resins such as phenolic resins, polyether imides, polyamides. The binder may have lubricating properties and may then be used alone as a combined lubricant/binder.

Compaction

The compacting could be carried out at pressures up to 2000 MPa although normally the pressure varies between 400 and 1000 MPa. The compacting could be carried out both at ambient and elevated temperature. Furthermore the compacting operation is preferably performed as an uniaxial pressure moulding operation in a die or as high velocity compaction as described in the U.S. Pat. No. 6,503,444 Die wall lubrication where an external lubricant is applied on the walls of the die could be used for eliminating the need of internal lubricants. Optionally a combination of internal and external lubrication may be used. An advantage with the new powder in comparison with similar known powders is that, at the same compaction pressure, a higher density can be reached.

Heat Treatment

The total loss is considerably reduced by the heat treatment procedure. In contrast to the conventional material of laminated steel the total loss of the insulated powder is dominated by hysteresis loss which is relatively high at low frequency. However due to the heat treatment, the hysteresis loss is decreased. At higher frequency a large eddy current loss will result in a considerable increase in total loss. It has now surprisingly been found that the powder according to the present invention can withstand a higher heat treatment temperature.

The invention is further illustrated by the following non-limiting examples:

EXAMPLE 1

Three different iron powders with the same particle size distribution and a mean particle size less than 150 μm, but with different content of impurities according to table 1, were annealed at 1150° C. for 40 min in a hydrogen atmosphere. After annealing the powder were subjected to a phosphate coating treatment according to patent application U.S. Pat. No. 6,348,265. The powders were further mixed with 0.5% of a lubricant, KENOLUBE® and moulded at ambient temperature into rings with an inner diameter of 45 mm, an outer diameter of 55 mm and a height of 5 mm at a pressure of 800 MPa. The density of the moulded rings were 7.3 g/cm$^3$. A heat treatment process at 500° C. for 0.5 h in an atmosphere of air was performed. A four point resistivity measurement was made according to Koefoed O., 1979 Geosounding Principles 1, Resistivity sounding measurements, Elsevier Scinece Publishing company, Amsterdam.

TABLE 1

| Impurities | Powder A | Powder B | Powder C |
|---|---|---|---|
| C | 0.0028 | 0.0026 | 0.0025 |
| Cr | 0.039 | 0.030 | 0.030 |
| Cu | 0.066 | 0.019 | 0.014 |
| Mn | 0.127 | 0.085 | 0.059 |
| Ni | 0.049 | 0.026 | 0.020 |
| P | 0.010 | 0.006 | 0.006 |
| S | 0.011 | 0.008 | 0.001 |
| Si | 0.009 | 0.005 | 0.004 |
| Sum | 0.31 | 0.18 | 0.14 |

Oxygen content after annealing:

O 0.02 0.02 0.02

FIG. 1 shows the effect of the content of impurities other than oxygen in the parent phase of phosphate coated iron powder versus the resisitvity of a moulded and heat-treated body produced from the powder.

EXAMPLE 2

This example demonstrates the effect of the annealing procedure and the oxygen content of the parent phase of phosphate coated iron powder on the resistivty and core losses. The same iron powder as Powder B in example 1 but with a coarser particle size distribution, was used, mean particle size less than 425 μm. Three different annealing procedures were applied according to table 2. The three different samples were subjected to a phosphate treatment according to example 1. Three different rings, respectively, were moulded and heat-treated according to example 1. The reached density of the rings were 7.4 g/cm$^3$. Resistivity of the components was measured according to example 1. For core loss and magnetic permeability measurements the rings were "wired" with 112 turns for the primary circuit and 25 turns for the secondary circuit enabling measurements of magnetic properties measured at 1 T, 400 Hz. with the aid of a hysteresisgraph, Brockhaus MPG 100.

TABLE 2

| Sample | Annealing temperature | Annealing time | Oxygen content |
|---|---|---|---|
| 1 | 1150° C. | 40 min | 0.015% |
| 2 | 1020° C. | 100 min | 0.035% |
| 3 | 1020° C. | 40 min | 0.053% |

Figure 2:
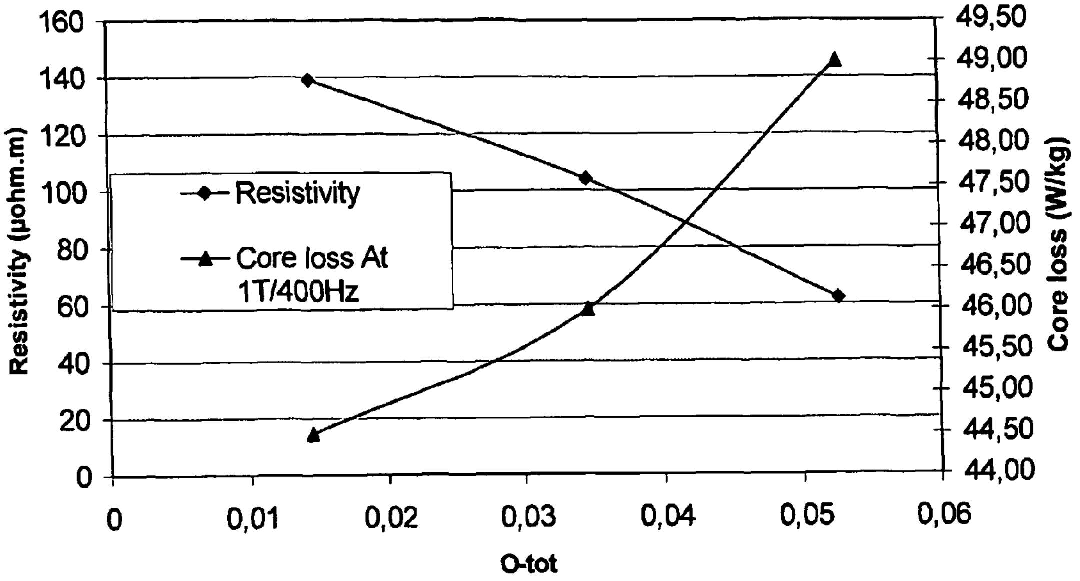
FIG. 2 shows how the resistivity increases and the core losses decrease with the decreased oxygen content of the parent phase of a phosphate coated iron powder.

As can be seen from FIG. 2 the resistivity increases and the core losses decrease with decreased oxygen content of the parent phase of a phosphate coated iron powder.

EXAMPLE 3

This example demonstrates the effect of the specific surface, measured by the BET-method, of the annealed atomised iron powder.

Two samples of an iron powder with impurity content according to Powder B in example 1, and the same particle size distribution and an mean particle size particle size less than 425 μm were used. Further, one sample with a finer particle size distribution, a mean particle size less than 150 μm was also tested.

The samples with the same particle size distribution were annealed in an atmosphere of hydrogen at temperatures and annealing times enough to reach an oxygen content of 0.035% and 0.08%, respectively, followed by a treatment with a phosphate solution according to example 2. The sample with the finer particle size distribution was annealed in an atmosphere of hydrogen at temperatures and annealing times enough to reach an oxygen content of 0.035% Magnetic rings were prepared according to the method described in example 2 and the resistivity, core losses and magnetic permeability were measured as disclosed in this example. The specific surface and oxygen content were measured after annealing. Table 3 shows the result of magnetic measurements and the characteristics of the annealed parent phase of the soft magnetic composite powder.

TABLE 3

| Particle size | Impurities % | BET-surface m$^2$/kg | Oxygen content % | Core losses W/kg | Resistivity μohm.m | Permeability |
|---|---|---|---|---|---|---|
| <150 μm | 0.14 | 64 | 0.035 | 58 | 45 | 480 |
| <425 μm | 0.18 | 57 | 0.08 | 80 | 30 | 585 |
| <425 μm | 0.18 | 50 | 0.035 | 45 | 150 | 673 |

Table 3 shows that soft magnetic components prepared from those base powders which have the lowest oxygen content and the lowest specific surface area have superior magnetic properties.

EXAMPLE 4

This example shows the effect on magnetic permeability and resistivity and total core loss for a component produced by the new soft magnetic composite powder compared with a component produced by a known powder disclosed in U.S. Pat. No. 6,348,265.

| | New powder, compaction pressure 800 MPa, density 7.44 g/cm³ | | | Known powder compaction pressure 800 MPa, density 7.38 g/cm³ | | |
|---|---|---|---|---|---|---|
| | Permeability | Resistivity μΩm | Core loss W/kg | Permeability | Resistivity μΩm | Core loss W/kg |
| Component heat treated 500° C. | 669 | 135 | 45 | 492 | 44 | 54 |
| Component heat treated 550° C. | 740 | 22 | 46 | 522 | 2 | 80 |

As can be seen from table 4 both the magnetic permeability and the resistivity are higher and the core loss is lower for the new powder compared with the known powder at the same heat treating temperature. The above mentioned findings, illustrated by the examples, disclose an atomised iron powder, suitable for producing soft magnetic composite powder. This powder can be used for producing magnetic cores with a resistivity higher than 40 μohm.m, a core loss less than 50 W/kg at 1 T, 400 Hz and a maximum permeability above 600 produced by PM moulding at ambient or elevated temperature and conventional moulding pressures.

The invention claimed is:

1. A high purity water atomized, annealed iron powder suitable for the preparation of soft magnetic composites consisting of a base powder, the particles of which are irregularly shaped and surrounded by an electrically insulating coating wherein the content of inevitable impurities of the base powder is less than 0.30% by weight, the oxygen content of the base powder is less than 0.05% by weight, and the specific surface area of the base powder as measured by the BET method is less than 60 $m^2$/kg.

2. Powder according to claim 1, wherein the particle size of the base powder is above about 100 μm.

3. Powder according to claim 2, wherein the base powder includes less than 0.25% by weight of impurities.

4. Powder according to claim 3, wherein the base powder has an oxygen content less than 0.04% by weight.

5. Powder according to claim 1, wherein the base powder has a specific surface area less than 55 $m^2$/kg.

6. Powder according to claim 1, wherein the coating includes phosphorus and oxygen.

7. Powder according to claim 6, wherein the phosphorus content of the electrically insulated powder particles is less than 0.10% by weight.

8. Powder according to claim 6, wherein the oxygen content of the electrically insulated powder particles is less than 0.20% by weight.

9. Powder according to claim 1, wherein the particle size of the base powder is between 100 and 450 μm.

10. Powder according to claim 1, wherein the particle size of the base powder is between 180 and 360 μm.

11. Powder according to claim 1, wherein the base powder includes less than 0.20% by weight of impurities.

12. Powder according to claim 1, wherein the oxygen content is less than 0.03% by weight.

13. Powder according to claim 1, wherein the base powder has a specific surface area of less than 50 $m^2$/kg.

14. Powder composition including the powder as defined in claim 1 in combination with a lubricant and/or a binder.

15. Powder composition according to claim 14, wherein the amount of lubricant is less than about 4% by weight of the powder composition.

16. Powder composition according to claim 14, wherein the amount of lubricant is between 0.1 and 2% by weight of the powder composition.

17. Method of preparing a soft composite material comprising the steps of:

a) providing a pure water atomized iron powder having irregularly shaded particles and a total content of impurities of less than 0.30% by weight, and a specific surface area as measured by the BET method less than 60 $m^2$/kg;

b) annealing the iron powder in a reducing atmosphere at a temperature and for a time period sufficient to reduce the oxygen content to a value below 0.05% by weight of the iron powder;

c) providing an electrically insulating coating on the iron powder particles;

d) mixing the obtained powder with a lubricant and/or binder;

e) compacting the powder obtained according to step d) to a green body; and f) optionally heating the obtained green body.

18. Method according to claim 17, wherein the annealing is performed at a temperature of at least 900° C.

19. Method according to claim 17, wherein the annealing is performed at a period of at least 5 minutes.

20. Method according to claim 17, wherein the electrically insulating coating is obtained by treating the annealed powder with phosphorus containing solution.

21. Method according to claim 17, wherein the compaction is performed at a pressure up to 2000 MPa.

22. Method according to claim 17, wherein the compaction is performed with external lubrication optionally without internal lubricant.

* * * * *